UNITED STATES PATENT OFFICE.

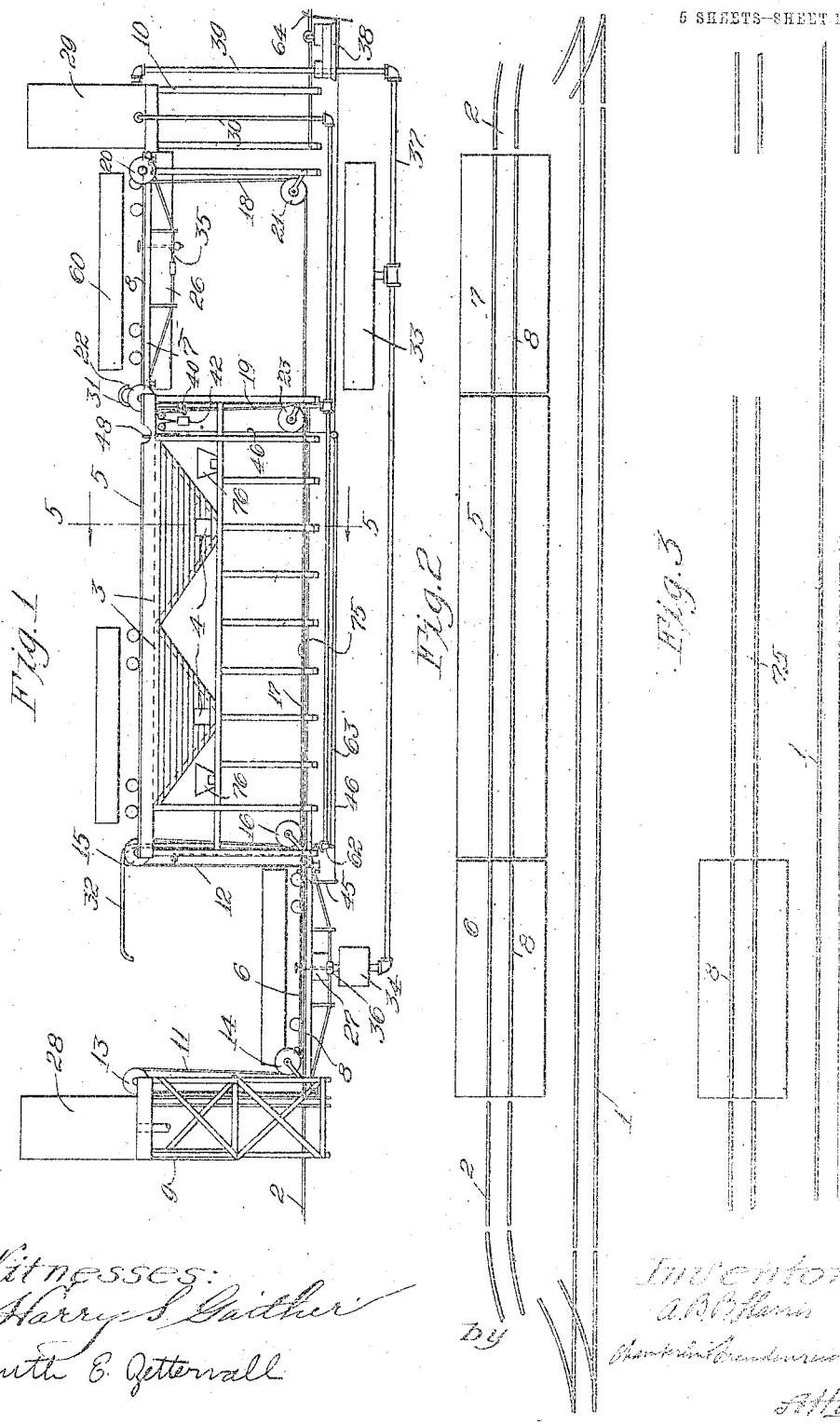

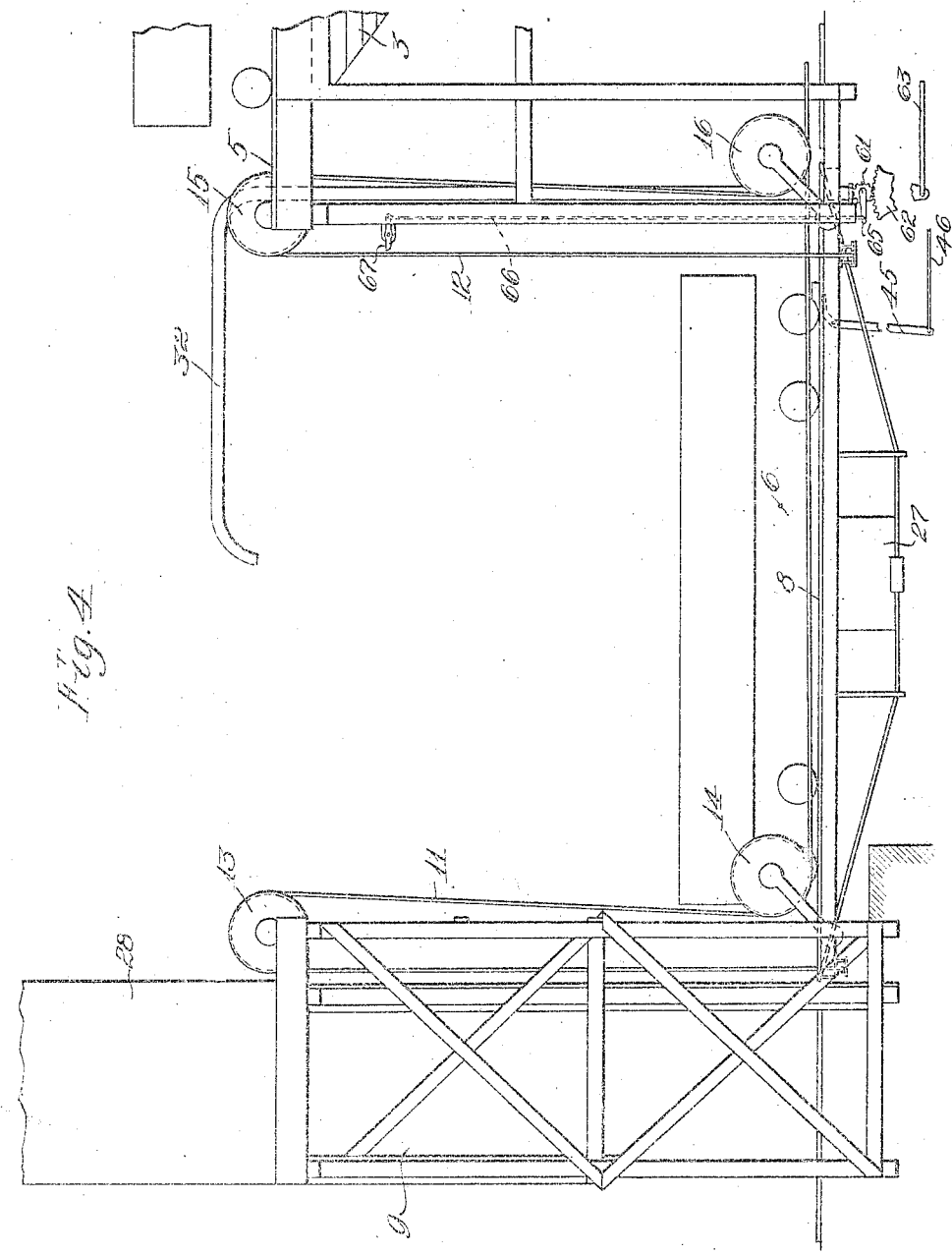

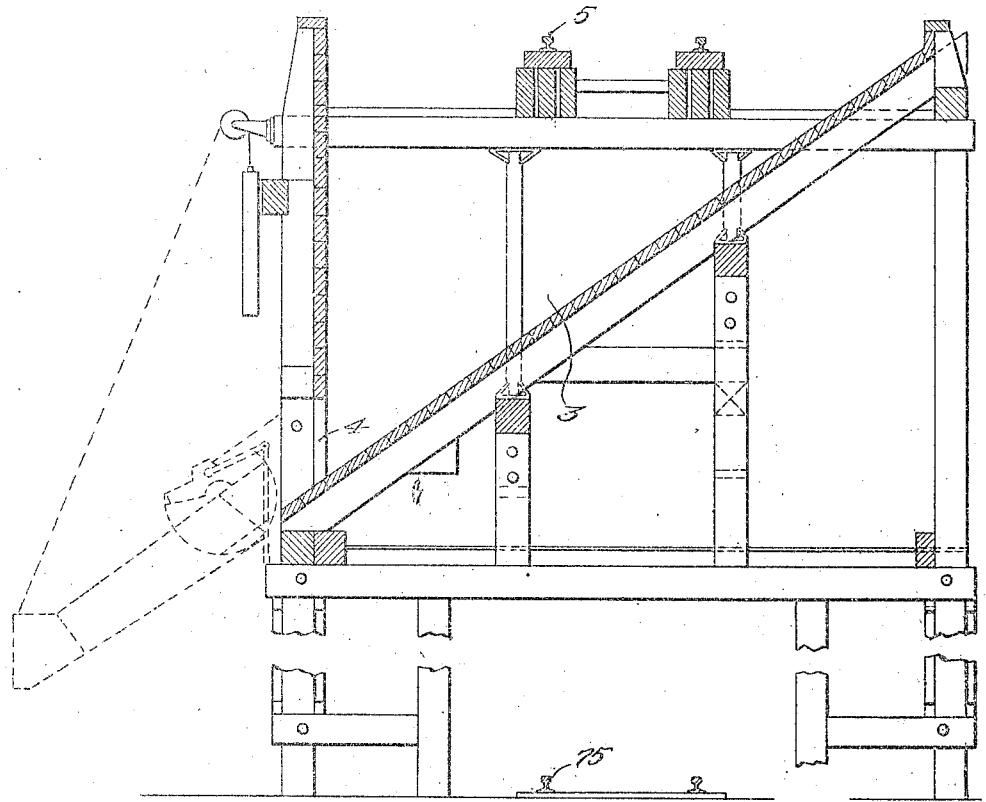

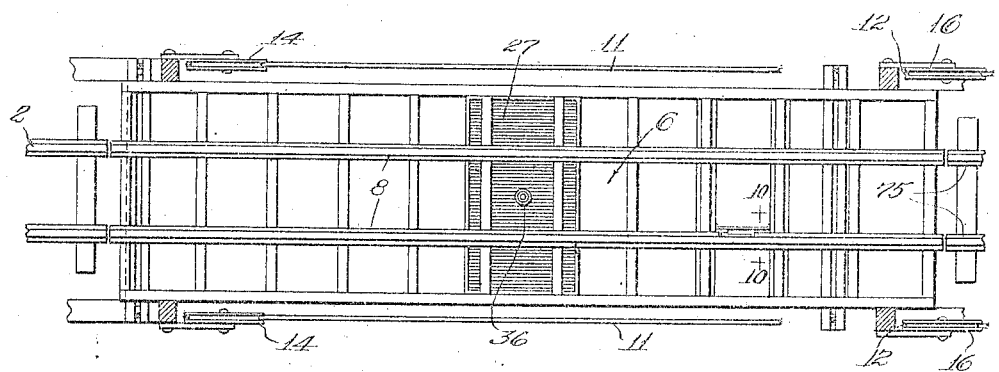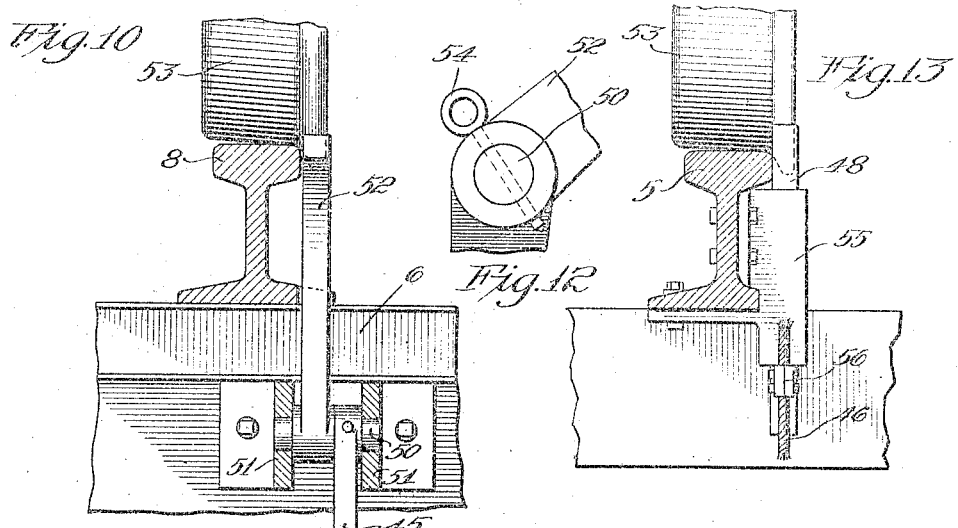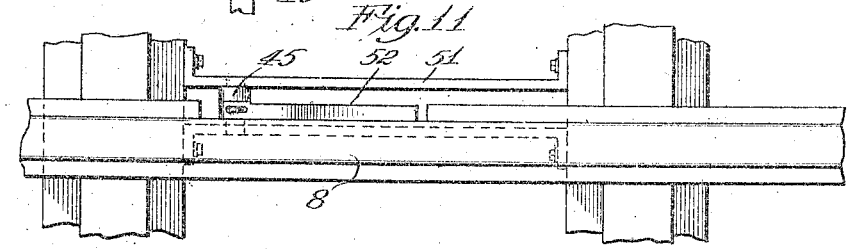

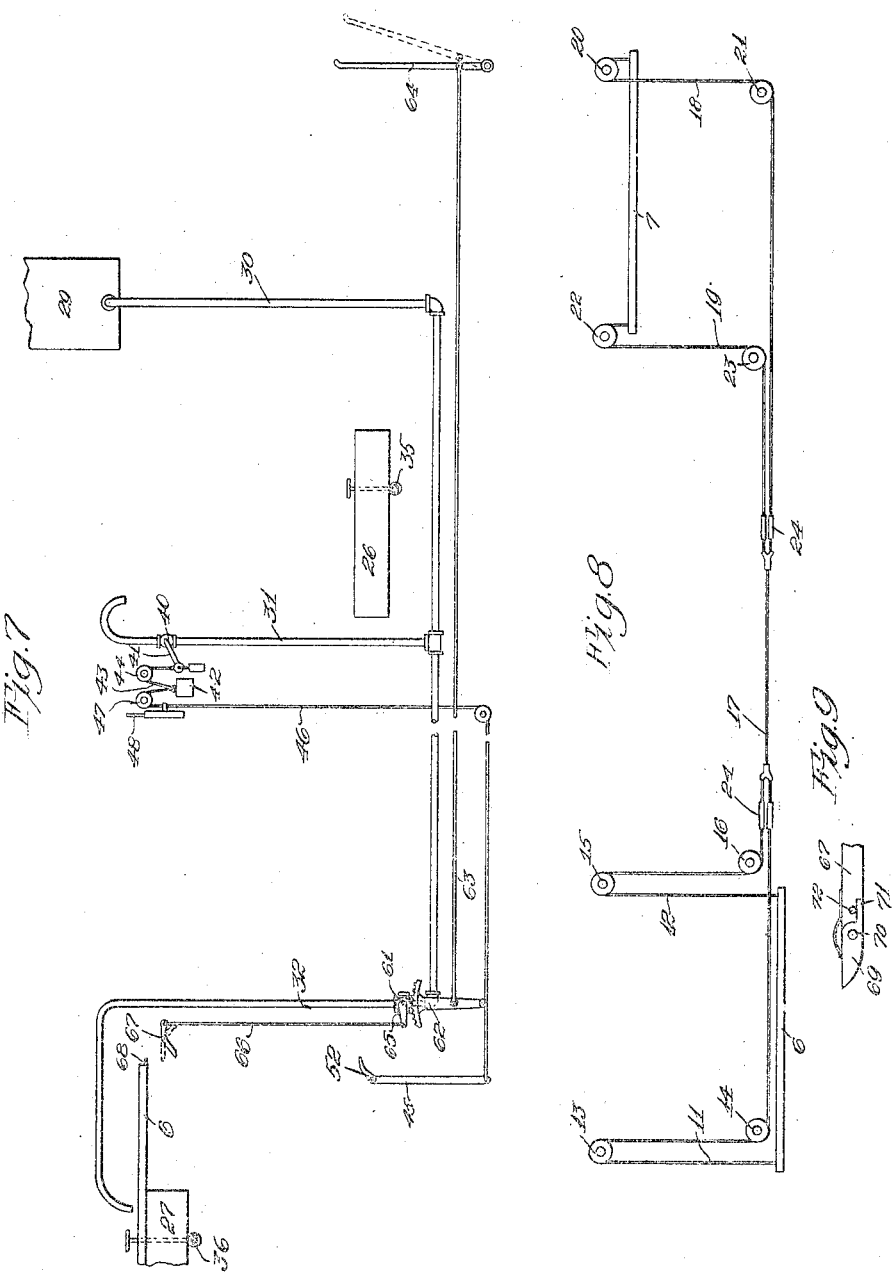

ALEXANDER B. B. HARRIS, OF CHICAGO, ILLINOIS, ASSIGNOR OF ONE-HALF TO WILLIAM G. ARN, OF MEMPHIS, TENNESSEE.

COALING-STATION.

1,082,194.

Specification of Letters Patent.

Patented Dec. 23, 1913.

Application filed October 2, 1912. Serial No. 723,533.

*To all whom it may concern:*

Be it known that I, ALEXANDER B. B. HARRIS, a citizen of the United States, residing at Chicago, county of Cook, State of Illinois, have invented a certain new and useful Improvement in Coaling - Stations, and declare the following to be a full, clear, and exact description of the same, such as will enable others skilled in the art to which it pertains to make and use the same, reference being had to the accompanying drawings, which form a part of this specification.

Coal is ordinarily supplied to locomotive tenders from stations carrying an elevated supply of coal which may be caused to flow by gravity through suitable chutes into the top of the tenders. This arrangement requires the coal to be stored at a considerable height and, to bring it to this height, it is the custom to run the cars up long inclines to bring them above the level of the bins or pockets. These long inclines are expensive and must often be placed on ground which could be otherwise used. Furthermore, whenever a loaded car is required, a locomotive must be employed to push it up the incline and where the capacity of the coaling station is considerable, a large part of the time of a locomotive and its crew may be employed in delivering the full cars and removing the empty cars.

The object of my invention is to produce a simple and compact coaling station permitting any desired number of cars to be emptied and removed without requiring the services of a locomotive.

A further object of my invention is to produce a simple and novel coaling station which will permit the usual working men with perhaps an additional attendant, to take loaded cars from a convenient siding, unload them and run them upon another siding or continuation of the first one, without obstructing the main track and without requiring the presence of a locomotive except to deliver a string of cars and take a string of cars away.

A further object of my invention is to produce a simple and novel construction and arrangement adapted to serve as a combination station for coaling, supplying water and supplying sand.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a side elevation of the station arranged in accordance with a preferred form of my invention, the ground upon which the station stands being omitted; Fig. 2 is a diagrammatic top plan view of the station; Fig. 3 is a diagrammatic plan view of the tracks at the surface level, with the receiving elevator down; Fig. 4 is a side elevation, on an enlarged scale, of one end of the station; Fig. 5 is a cross section on an enlarged scale on line 5—5 of Fig. 1; Fig. 6 is a section on an enlarged scale taken just above the receiving elevator when the latter is down; Fig. 7 is a diagram of the automatic controlling means for the elevators; Fig. 8 is a diagram of the connections between the elevators, on one side of the latter; Fig. 9 is a detail on an enlarged scale of a trip device actuated by the receiving elevator to shut off the water which serves as a counter-balance; Fig. 10 is a section on an enlarged scale on line 10—10 of Fig. 6; Fig. 11 is a plan view of the parts shown in Fig. 10, the car wheel being omitted; Fig. 12 is a detail of the dog shown in Figs. 10 and 11; Fig. 13 is a section through one of the elevated rails on the unloading station, near the elevator for empty cars showing the automatic chock for preventing the cars from rolling off; Fig. 14 is an end view of a modified form of station associated with two main tracks lying beside each other; and Fig. 15 is an end view of still another form of station adapted for still another arrangement of tracks.

I have heretofore referred to my improved apparatus as one particularly intended to be used as a coaling station and, for the sake of brevity, I have illustrated it in the drawings as such and shall confine the detailed description to this particular embodiment; it will of course be understood that my invention is not limited to coaling stations but may be used wherever it is desired to unload railway cars at a considerable elevation above the usual tracks.

Referring now to the drawings, 1 represents a main track on which locomotives to be coaled or to be supplied with water or sand are adapted to stand.

2 is a side track connected with the main track and lying adjacent thereto, the side track being of any desired length. Between the ends of the side track is a station comprising one or more elevated coal bins or pockets, 3, having discharge outlets, 4, through which coal may be discharged into the tender of a locomotive standing on the main track. On the structure above the coal pockets is a track, 5, on which the cars which are being unloaded are adapted to stand.

Instead of the usual long expensive inclines over which the cars may travel when being brought into and carried away from the unloading position, I make use of two elevators, 6 and 7, one at each end of the station and each having a track section, 8, adapted to aline with and form a continuation of the elevated track when the corresponding elevator is up and to form a continuation of the interrupted side track when the corresponding elevator is down. By making the siding long enough, the required number of loaded cars may be run upon the siding at one end of the station and they may then be lifted one at a time, by the receiving elevator, 6, and run upon the track, 5, where they are unloaded; the empty cars thereafter being lowered by the elevator, 7, and run upon the siding at the opposite end of the station. In this way, the service of a locomotive is required only to deliver a string of full cars and afterward to take away a string of empty cars, the main track being left entirely unobstructed either by the coal cars or by the locomotive. By making all of the tracks inclined slightly so that the natural tendency of the cars is to roll by gravity through the entire system, no other labor is required to shift the cars than that which is necessary to remove a block or chock in order to permit a car to roll upon the receiving elevator, to roll from the receiving elevator upon the elevated track, to roll from the elevated track upon the elevator, 7, and to roll from that elevator to the siding, in addition to the attention which must be given to the elevators.

If desired, the cars may be controlled by the brakes instead of by chocks. Furthermore, the receiving elevator may have a chock which engages a stationary part when that elevator is up and leaves the car free to run upon the elevated track while the other elevator may have a similar chock similarly operated when the elevator is down so as to let the empty car roll upon the siding. The elevators may take any usual or preferred form. In the arrangement shown, I have arranged across the side track at each end of the unloading station a tower as indicated at 9 and 10, respectively, each elevator being guided at one end by the structure of the loading station and at the opposite end by one of the towers. I also prefer to connect the elevators together so that when one moves down the other moves up, and vice versa. This may be accomplished in various ways. In the arrangement shown, (see particularly Figs. 1 and 8,) the elevator, 6, is suspended from the four corners by cables, 11 and 12. Each of the cables, 11, passes over a pulley, 13, mounted upon the top of the tower, 9, beneath a pulley, 14, anchored at the bottom of the tower, 9, and thence laterally toward the opposite end of the structure. In the same way, each of the cables, 12, passes up over a pulley, 15, at the top of the unloading station, down under a pulley, 16, anchored near the bottom of the station and then laterally. The two ends of the cables, 11 and 12 on each side of the elevator may be connected together to a common cable, 17, which passes across the station to the opposite side where it is connected to cables, 18 and 19, corresponding to the cables, 11 and 12, and supporting one side of the elevator, 7. The cable, 18, passes around the pulleys, 20 and 21, corresponding to the pulleys, 13 and 14, while the cable, 19, passes around pulleys, 22 and 23, corresponding to the pulleys, 15 and 16. Each of the main cables may be provided with a turn buckle as indicated at 24 in order that each cable may be adjusted independently of the others. By the arrangement just described it will be seen that neither elevator can move without producing a corresponding movement of the other, each serving as a counter-balance for the other.

The receiving elevator lifts loaded cars and descends without a load while the other elevator ascends without a load and descends with empty cars. Consequently, under working conditions, the elevators with whatever load they may carry will not counter-balance each other or over-balance each other in the proper manner to effect the raising of the loaded cars and the lowering of the empty cars. Power of some sort must therefore be applied in order to carry the cars up and down. This power may of course be applied in various ways, but I prefer to make use of shifting counter-balances which may be added and removed easily to give the elevator which is to descend a greater weight than the other elevator. This counter-balancing may also be effected in various ways although I prefer the arrangement illustrated, namely a counter-balance consisting of water, together with means for pumping or otherwise delivering and discharging the water at the proper times. In the arrangement shown, I have provided the elevator 7, with a water tank, 26, which will hold enough water to cause the elevator 7, when weighted with an empty car to lift the other elevator and a loaded car. The tank, 26, of course adds considerable weight to the elevator to which it is attached and therefore this elevator will normally be heavier than the other. Therefore, in order to make it possible for the receiving elevator, when empty, to overbalance the other elevator I have provided a receiving elevator with a small water tank, 27; the parts being so proportioned that when the elevator 7 is empty and there is no water in the tank, 26, the empty elevator, 6, with its tank full will be the heavier and will therefore descend.

The water for the counter-balancing tanks may of course be supplied from any suitable source and it may be wasted or else used over again after it is discharged from the tanks. Since the amount of water required, particularly in connection with a station of considerable capacity, is large, it will often be desirable to use the same water over and over again and this is the construction which I have illustrated. Referring to the drawings, it will be seen that I have placed upon each of the towers a large water tank, these being indicated at 28 and 29. Either or both of these tanks may be used to hold water for supplying locomotives with water and either or both of the tanks may be used for supplying water to the elevator system. In the arrangement shown, (see particularly Figs. 1 and 7,) a pipe 30, leading from storage tank, 29, has two branch pipes, 31 and 32, provided with outlets directly above the counter-balancing tanks, 26 and 27 when the elevators carrying these tanks are in their raised positions. In suitable pits below the elevators are open-top sumps, 33 and 34, the former being adapted to receive the discharge from the tank 26 through a suitable valve, 35, and the latter being adapted to receive the discharge from the tank 27 through a suitable valve, 36. The valves 35 and 36 may take any suitable form but, for the sake of safety, I prefer to make them manually operated so that the counter-balancing tanks will not be emptied accidentally. From the sumps extends a pipe 37 which leads into the suction side of a suitable pump 38, the pump in turn discharging into the main tank 29 through a pipe 39. It will thus be seen that water may be admitted from the main storage tank into either of the counter-balancing tanks, assuming that proper controlling valves are provided, and, when either elevator is down, its tank may be emptied into the corresponding sump from which the water is again pumped to the main storage tank. While the discharge of the counter-balancing tanks is preferably controlled manually, the filling of these tanks is preferably accomplished automatically, being controlled by cars moving on and off the elevator. In the pipe, 31, is a valve, 40, controlled by a lever, 41, which is counter-weighted so that when free to do so it holds the valve open. The valve is normally held closed by a weight, 42, carried on one end of a flexible rope, cable or other member, 43, this member passing over a pulley, 44, and having its other end connected to the lever. A lever, 45, is fulcrumed upon some stationary part adjacent to the receiving elevator, when the latter is in its lower position, and adapted to be actuated by some part of a car which enters upon this elevator, is connected to the weight, 42, by means of a cable, 46; the arrangement being such that when a car enters upon the receiving elevator, the lever, 45, is actuated so as to lift the weight, 42, and allow the valve, 40, to open. In the arrangement shown, the cable, 46, passes over a pulley, 47, in proximity to the track on the elevated structure and it is connected with a vertically-movable chock or stop, 48, which normally extends above one of the rails of the elevated track and prevents a car from rolling off the elevated track to the elevator, 7.

When the lever, 45, is actuated to open the valve, 40, the chock or stop, 48, is withdrawn, thus permitting a car which has been unloaded to roll upon the elevator, 7. The details of the lever mechanism, 45 and of the chock device are best shown in Figs. 10 to 13 inclusive. Referring to Figs. 10 to 12, it will be seen that the lever, 45, is fixed to a short shaft, 50, journaled in stationary brackets, 51, lying just below and at one side of the rails of the track, 8, when the elevator, 6, is down. On the shaft, 50, is an upwardly-projecting arm, 52, which lies just beside and projects above the rail on the elevator. The members 45 and 52 are consequently the two members of a bell crank lever. The parts are so proportioned that the flange of a wheel, 53, will strike the arm 52 and depress it, thus swinging the lever 45 in the manner heretofore explained. As will herein-after appear, it is sometimes desirable to run a car across the receiving elevator and under the coal pockets, in which case the automatic valve should not be actuated. I have therefore connected the arm 52 to the shaft 50 in such a manner that the arm may be detached and dropped down out of the way when desired. In the arrangement shown, this is accomplished by securing the arm 52 to the shaft member by means of a pin or key, 54, which may be withdrawn, when desired, and thus allow the arm to drop down out of the way.

In Fig. 13 I have shown the rail of the track, 5, to which the chock or stop, 48, is applied. Secured to the rail or to the support for the rail is a vertical guide, 55, in which the chock or stop is adapted to slide. The upper end of the stop or chock projects above the guide and the lower end below the guide where it is fastened to the cable 46 in any suitable manner, as indicated at 56. It will thus be seen that when there is an empty car on the elevated track 5, held against rolling off by the chock 48, and a loaded car is run upon the receiving elevator, the chock is withdrawn so that the empty car may run upon the elevator 7, as indicated at 60, and the valve in the pipe 31 is opened so that water begins to flow into the reservoir carried by the elevator 7; the parts being now in the positions indicated in Fig. 1 and remaining in those positions until enough water has been supplied to the reservoir on the elevator 7 to cause that elevator to over-balance the receiving elevator and therefore lift the latter with its load. As soon as the receiving elevator begins to rise, the wheel of the loaded car which holds the arm 52 depressed, is lifted away from the arm and therefore the weight 42 closes the valve 40 and lifts the chock 48, at the same time returning the lever 45 and the arm 52 to their normal positions. Consequently no more water flows into the tank on the elevator 7, and a car on the elevated tracks is prevented from rolling off by the chock. The two elevators continue their movements until the elevator 7 is down and the other elevator is up, nothing further happening thereafter until some act is performed by the attendants. The loaded car is now run upon the elevated track, leaving the receiving elevator empty. The empty car is then run off of the elevator 7 and the elevators are then ready to be returned, each to receive a new load. Before the elevators will return to the positions indicated in Fig. 1, the water must be let out of the reservoir 26, through the valve 35, and the reservoir or tank 27 on the other elevator must be filled. The filling of the reservoir 27 is accomplished automatically when the empty car is rolled off of the elevator 7. To this end I have arranged in the supply pipe, 32, for the tank or reservoir, 27, a valve, 61, having an operating device, 62, connected to one end of a cable, 63, which extends to and is secured to a lever, 64, mounted adjacent to the side track at some distance away from the elevator 7; the arrangement being such that when an empty car is rolled off of the elevator 7, it actuates the lever 64 and opens the valve 61 so that water can flow into the tank or reservoir, 27. Water will therefore flow into the tank or reservoir 27 until the receiving elevator is counter-weighted sufficiently to over-balance the elevator 7 and its empty tank. When this over-balancing occurs, the elevator 6 descends and lifts the other elevator until the parts occupy the positions in Fig. 1.

In order to stop the flow of water to the tank or reservoir 27, I have provided means for automatically closing the valve 61 as the receiving elevator begins to descend. This may conveniently be accomplished by providing the actuating mechanism for the valve 61 with an arm 65 to which is attached a cable 66 leading up to one end of a dog or lever 67 whose opposite end is in the path of movement of a projection 68 on the lever. As the elevator descends, the projection strikes the dog or lever 67 and closes the valve. In order that the projection on the elevator may travel past the dog or lever as the elevator rises, the end of the latter may be constructed as shown in Fig. 9, a part 69 being pivoted to the body of the dog as at 70 and having a finger 71 which engages with a stop 72 to limit the swinging movement in one direction and permit a swinging movement in the opposite direction, that is the direction in which the elevator tends to swing the dog as the elevator rises.

It is sometimes desirable to make provision for supplying locomotives with sand at the time they are coaling. I have therefore made provision for maintaining a supply of sand. To this end I have placed underneath the coal pockets a track section 75 which is at the same level as the side track, and have so formed the structure that, when desired, a car may be run across the receiving elevator and underneath the coal pockets upon the track 75; the arm 52 being at this time swung out of the way so that the controlling valve 40 and the chock 48 will not be operated. On the supporting structure for the coal pockets I have provided one or more hoppers, 76, for containing sand, these hoppers being of any suitable construction adapted to deliver sand to locomotives. It will thus be seen that a sand car may be run under the coal pockets where there is sufficient room to dry the sand in the usual way and supply it to the hoppers.

In Fig. 14 I have illustrated an arrangement of the coaling station where there are two main tracks, avoiding the necessity of spreading the tracks in order to place the station between them. Referring to this figure, 80 and 81 represent two main tracks beside which is placed the station having a hopper or coal pocket, 3, like that heretofore described, for supplying coal to a locomotive standing on track 81. Beyond the hopper, 3, is a second hopper, 82, which is elevated so that a discharge chute, 83, may be led therefrom across the track 81 and into proximity to the track 80. In this arrangement, the elevated track, 84, will be higher than the elevated track 5 in the first form in order that the coal may be dumped into the higher hopper or pocket 82 as well as into the hopper 3. The outer end of the chute 83 may be supported by a suitable post, 85, arranged between the two main tracks. Consequently the main tracks need only be far enough apart to permit the rolling stock on each track to clear the post.

In the arrangement heretofore described, the construction is one adapted for a station where there is room at each end of the station for a piece of siding. It sometimes happens that the coaling station must be located at some point beyond which a siding cannot extend. In Fig. 15 I have shown a construction which may be employed where cars must be returned from the station in the same direction in which they came. The framework, 90, for the hopper or pocket, 3, is made wide enough to permit the elevator, 91, for empty cars to be raised and lowered on an incline, the incline being sufficient to carry the empty cars laterally to a siding on one side of the station proper. Thus, in the arrangement shown, viewed in the plan, the elevated track, 5, lies between the main track, 1, and a side track registering with the track section, 92, on the elevator when the elevator is down. The elevator may of course be constructed and operated in any suitable manner. In the arrangement shown, one side of the elevator is inclined as indicated at 93 and runs upon an incline guide, 94, whenever the cable, 95, is actuated in one direction or the other.

While I have illustrated and described with particularity only a single preferred form of my invention, I do not desire to be limited to the structural details thus illustrated and described, but intend to cover all the forms and arrangements which come within the terms employed in the definitions of my invention constituting the appended claims.

I claim:

1. In combination, an unloading station having an elevated track for receiving railway cars, low-level tracks at the opposite ends of the elevated track, an elevator between each of the latter tracks and the elevated track, each of said elevators having a track section adapted to register with one of the low-level tracks when the corresponding elevator is down and with the elevated track when the corresponding elevator is up.

2. In combination, an unloading station having an elevated track for receiving railway cars, low-level tracks at the opposite ends of the elevated track, an elevator between each of the latter tracks and the elevated track, each of said elevators having a track section adapted to register with one of the low-level tracks when the corresponding elevator is down and with the elevated track when the corresponding elevator is up, and connections between said elevators for causing them to travel simultaneously but in opposite directions.

3. In combination, a main railway track, a side track connecting with the main track, an unloading station lying beside the main track and interrupting the side track, an elevated track on the unloading station for receiving railway cars, elevators at opposite ends of said station, each elevator having a track section adapted to form a continuation of the side track when the corresponding elevator is down and a continuation of the elevated track when the corresponding elevator is up.

4. In combination, a main railway track, a side track connected with the main track, an unloading station lying beside the main track and interrupting the side track, said unloading station having an elevated track for receiving railway cars to be unloaded, an elevator between the side track and the station, said elevator having a track section adapted to form a continuation of the side track when the elevator is down and a continuation of the elevated track when the elevator is up.

5. In combination, a main railway track, a side track connected with the main track, an unloading station lying beside the main track and interrupting the side track, said unloading station having an elevated track for receiving railway cars to be unloaded, an elevator between the side track and the station, said elevator having a track section adapted to form a continuation of the side track when the elevator is down and a continuation of the elevated track when the elevator is up, said station having an interior chamber at the level of the side track, and a track in said chamber in position to register with the track section on the elevator when the elevator is down.

6. In combination, an unloading station, an elevated track on said station for receiving railway cars to be unloaded, low-level tracks on the opposite sides of said station, an elevator between each of said low-level tracks and the station, each of said elevators having a track section adapted to register with the elevated track when the corresponding elevator is up and with the low-level track when the corresponding elevator is down, connections between said elevators for causing them to travel together but in opposite directions, a water reservoir in one of said elevators large enough to contain a supply of water sufficient to overbalance the contents of a loaded car on the other elevator, and means controlled by a car for filling and emptying said reservoir.

7. In combination, an unloading station, an elevated track on said station for receiving railway cars to be unloaded, low-level tracks on the opposite ends of the elevated track, an elevator between each of said low-level tracks and the elevated track, each of said elevators having a track section adapted to register with the elevated track when the corresponding elevator is up and with the low-level track when the corresponding elevator is down, connections between said elevators for causing them to travel together but in opposite directions, a water reservoir in one of said elevators large enough to contain a supply of water sufficient to overbalance the contents of a loaded car on the other elevator, and means for automatically admitting water to said reservoir when a car is run upon the other elevator.

8. In combination, an unloading station, an elevated track on said station for receiving railway cars to be unloaded, low-level tracks on the opposite ends of the elevated track, an elevator between each of said low-level tracks and the elevated track, each of said elevators having a track section adapted to register with the elevated track when the corresponding elevator is up and with the low-level track when the corresponding elevator is down, connections between said elevators for causing them to travel together but in opposite directions, reservoirs on said elevators adapted to receive water to serve as counter-balances, means for automatically admitting water to the reservoir on one elevator when a loaded car is run upon the other elevator, and means for automatically admitting water to the reservoirs on the last mentioned elevator when an empty car is taken off the other elevator.

9. In combination, an unloading station, an elevated track on said station for receiving railway cars to be unloaded, low level tracks adjacent to said station, two separated elevators in said station, each of said elevators having a track section adapted to register with the elevated track when the corresponding elevator is up and with the low level track when the corresponding elevator is down, connections between said elevators for causing them to travel together but in opposite directions, and means controlled by a full car run upon one of the elevators when it is down for setting said elevators in operation to raise the elevator carrying the full car and lower the other elevator.

In testimony whereof I sign this specification in the presence of two witnesses.

ALEXANDER B. B. HARRIS.

Witnesses:
 WM. F. FRENDENREICH,
 RUTH E. ZETTERVALE.